(12) United States Patent
Ganmukhi et al.

(10) Patent No.: US 6,259,693 B1
(45) Date of Patent: Jul. 10, 2001

(54) CELL COMBINATION TO UTILIZE AVAILABLE SWITCH BANDWIDTH

(75) Inventors: Mahesh N. Ganmukhi, Carlisle; Patrick L. DeAngelis, Northborough; Ronald Louis Baracka, Jr., Hudson, all of MA (US)

(73) Assignee: Ascend Communications, Inc., Westford, MA (US)

( * ) Notice: Subject to any disclaimer, the term of this patent is extended or adjusted under 35 U.S.C. 154(b) by 0 days.

(21) Appl. No.: 08/919,830

(22) Filed: Aug. 28, 1997

(51) Int. Cl.[7] ................................................. H04Q 11/00
(52) U.S. Cl. ........................... 370/366; 370/537; 370/542
(58) Field of Search .................................... 370/356, 360, 370/366, 375, 376, 395, 391, 413–418, 428, 537, 542

(56) References Cited

U.S. PATENT DOCUMENTS

| | | | |
|---|---|---|---|
| 5,280,475 | * 1/1994 | Yanagi et al. | 370/395 |
| 5,303,078 | * 4/1994 | Brackett et al. | 370/395 |
| 5,436,886 | * 7/1995 | McGill | 370/395 |
| 5,537,400 | 7/1996 | Diaz et al. | 370/58.2 |
| 5,668,798 | * 9/1997 | Toubol et al. | 370/395 |
| 5,838,681 | * 11/1998 | Bonomi et al. | 370/395 |

FOREIGN PATENT DOCUMENTS

WO 95/30318   9/1995  (WO) .

* cited by examiner

Primary Examiner—Wellington Chin
Assistant Examiner—Maikhanh Tran
(74) Attorney, Agent, or Firm—Weingarten, Schurgin, Gagnebin & Hayes LLP

(57) ABSTRACT

An apparatus and method for enabling the combination of multiple streams of data cells into a single thread. By enabling plural input ports of an intermediate device to access a single parallel output port of the device, plural network switch elements share a single thread through a switch fabric. For instance, the method and apparatus permit interleaving the relatively low bandwidth cell outputs of two ATM network switch central control processors onto a single thread routed through an interconnected switch fabric. Certain of these cells are received from the switch fabric at a parallel input of the intermediate device, then routed to one of plural serial output ports. Pacing of cells provided to the plural serial input ports prevents exceeding the shared thread bandwidth.

15 Claims, 14 Drawing Sheets

FIG. 8

| REGISTER | DATA | INDIRECT READ ADDRESS | INDIRECT WRITE ADDRESS | Reserved |
|---|---|---|---|---|
| REGISTER TYPE | R/W | R/W | R/W | R |
| ADDRESS | 0 | 1 | 2 | 3 |
| BIT 7 | Data 7 | 0 | 0 | 0 |
| BIT 6 | Data 6 | 0 | 0 | 0 |
| BIT 5 | Data 5 | Addr5 | Addr5 | 0 |
| BIT 4 | Data 4 | Addr4 | Addr4 | 0 |
| BIT 3 | Data 3 | Addr3 | Addr3 | 0 |
| BIT 2 | Data 2 | Addr2 | Addr2 | 0 |
| BIT 1 | Data 1 | Addr1 | Addr1 | 0 |
| BIT 0 | Data 0 | Addr0 | Addr0 | 0 |

FIG. 9

| REGISTER | PARALLEL PORT ENABLE | PARALLEL PORT LOOPBACK | PARALLEL LOSS OF CLOCK STATUS | PARALLEL LOSS OF CLOCK MASK | PARALLEL SOC ERROR STATUS | PARALLEL SOC ERROR MASK | PARALLEL PARITY ERROR STATUS | PARALLEL PARITY ERROR MASK |
|---|---|---|---|---|---|---|---|---|
| TYPE | R/W | R/W | R/W | R/W | R/W | R/W | R/W | R/W |
| IND. ADDR | 0 | 1 | 2 | 3 | 4 | 5 | 6 | 7 |
| BIT 7 | Port 8 | Port 8 | Port 8 | Port 8 | Port 8 | Port 8 | Port 8 | Port 8 |
| BIT 6 | Port 7 | Port 7 | Port 7 | Port 7 | Port 7 | Port 7 | Port 7 | Port 7 |
| BIT 5 | Port 6 | Port 6 | Port 6 | Port 6 | Port 6 | Port 6 | Port 6 | Port 6 |
| BIT 4 | Port 5 | Port 5 | Port 5 | Port 5 | Port 5 | Port 5 | Port 5 | Port 5 |
| BIT 3 | Port 4 | Port 4 | Port 4 | Port 4 | Port 4 | Port 4 | Port 4 | Port 4 |
| BIT 2 | Port 3 | Port 3 | Port 3 | Port 3 | Port 3 | Port 3 | Port 3 | Port 3 |
| BIT 1 | Port 2 | Port 2 | Port 2 | Port 2 | Port 2 | Port 2 | Port 2 | Port 2 |
| BIT 0 | Port 1 | Port 1 | Port 1 | Port 1 | Port 1 | Port 1 | Port 1 | Port 1 |

FIG. 10

| REGISTER | PARALLEL CELL ERR COUNTER PORT 1 | PARALLEL CELL ERR COUNTER PORT 2 | PARALLEL CELL ERR COUNTER PORT 3 | PARALLEL CELL ERR COUNTER PORT 4 | PARALLEL CELL ERR COUNTER PORT 5 | PARALLEL CELL ERR COUNTER PORT 6 | PARALLEL CELL ERR COUNTER PORT 7 | PARALLEL CELL ERR COUNTER PORT 8 |
|---|---|---|---|---|---|---|---|---|
| TYPE | R | R | R | R | R | R | R | R |
| IND. ADDR | 8 | 9 | A | B | C | D | E | F |
| BIT 7 | CNT7 | CNT7 | CNT7 | CNT7 | CNT7 | CNT7 | CNT7 | CNT7 |
| BIT 6 | CNT6 | CNT6 | CNT6 | CNT6 | CNT6 | CNT6 | CNT6 | CNT6 |
| BIT 5 | CNT5 | CNT5 | CNT5 | CNT5 | CNT5 | CNT5 | CNT5 | CNT5 |
| BIT 4 | CNT4 | CNT4 | CNT4 | CNT4 | CNT4 | CNT4 | CNT4 | CNT4 |
| BIT 3 | CNT3 | CNT3 | CNT3 | CNT3 | CNT3 | CNT3 | CNT3 | CNT3 |
| BIT 2 | CNT2 | CNT2 | CNT2 | CNT2 | CNT2 | CNT2 | CNT2 | CNT2 |
| BIT 1 | CNT1 | CNT1 | CNT1 | CNT1 | CNT1 | CNT1 | CNT1 | CNT1 |
| BIT 0 | CNT0 | CNT0 | CNT0 | CNT0 | CNT0 | CNT0 | CNT0 | CNT0 |

FIG. 11

| REGISTER | PARALLEL MUX SELECT PORT 1 | PARALLEL MUX SELECT PORT 2 | PARALLEL MUX SELECT PORT 3 | PARALLEL MUX SELECT PORT 4 | PARALLEL MUX SELECT PORT 5 | PARALLEL MUX SELECT PORT 6 | PARALLEL MUX SELECT PORT 7 | PARALLEL MUX SELECT PORT 8 |
|---|---|---|---|---|---|---|---|---|
| TYPE | R/W | R/W | R/W | R/W | R/W | R/W | R/W | R/W |
| IND. ADDR | 10 | 11 | 12 | 13 | 14 | 15 | 16 | 17 |
| BIT 7 | 0 | 0 | 0 | 0 | 0 | 0 | 0 | 0 |
| BIT 6 | 0 | 0 | 0 | 0 | 0 | 0 | 0 | 0 |
| BIT 5 | 0 | 0 | 0 | 0 | 0 | 0 | 0 | 0 |
| BIT 4 | 0 | 0 | 0 | 0 | 0 | 0 | 0 | 0 |
| BIT 3 | 0 | 0 | 0 | 0 | 0 | 0 | 0 | 0 |
| BIT 2 | SEL2 | SEL2 | SEL2 | SEL2 | SEL2 | SEL2 | SEL2 | SEL2 |
| BIT 1 | SEL1 | SEL1 | SEL1 | SEL1 | SEL1 | SEL1 | SEL1 | SEL1 |
| BIT 0 | SEL0 | SEL0 | SEL0 | SEL0 | SEL0 | SEL0 | SEL0 | SEL0 |

| REGISTER | SERIAL PORT ENABLE | SERIAL PORT LOOPBACK | SERIAL PORT STATUS | SERIAL PORT STATUS MASK | SERIAL BIP-8 ERROR | SERIAL BIP-8 ERROR MASK | SYNC DECODE NORMAL | SYNC DECODE SWITCH |
|---|---|---|---|---|---|---|---|---|
| TYPE | R/W | R/W | R/W | R/W | R/W | R/W | R/W | R/W |
| IND. ADDR | 18 | 19 | 1A | 1B | 1C | 1D | 1E | 1F |
| BIT 7 | PORT 8 | 0 | 5-8 OVER | 5-8 OVER | PORT 8 | PORT 8 | 0 | 0 |
| BIT 6 | PORT 7 | 0 | 5-8 GONE | 5-8 GONE | PORT 7 | PORT 7 | reserved | reserved |
| BIT 5 | PORT 6 | 0 | 5-8 SOC | 5-8 SOC | PORT 6 | PORT 6 | reserved | reserved |
| BIT 4 | PORT 5 | PORT 5-8 | 5-8 LOC | 5-8 LOC | PORT 5 | PORT 5 | reserved | reserved |
| BIT 3 | PORT 4 | 0 | 1-4 OVER | 1-4 OVER | PORT 4 | PORT 4 | reserved | reserved |
| BIT 2 | PORT 3 | 0 | 1-4 GONE | 1-4 GONE | PORT 3 | PORT 3 | reserved | reserved |
| BIT 1 | PORT 2 | 0 | 1-4 SOC | 1-4 SOC | PORT 2 | PORT 2 | reserved | reserved |
| BIT 0 | PORT 1 | PORT 1-4 | 1-4 LOC | 1-4 LOC | PORT 1 | PORT 1 | 0 | 0 |

*FIG. 12*

| REGISTER | SERIAL CELL ERR COUNTER PORT 1 | SERIAL CELL ERR COUNTER PORT 2 | SERIAL CELL ERR COUNTER PORT 3 | SERIAL CELL ERR COUNTER PORT 4 | SERIAL CELL ERR COUNTER PORT 5 | SERIAL CELL ERR COUNTER PORT 6 | SERIAL CELL ERR COUNTER PORT 7 | SERIAL CELL ERR COUNTER PORT 8 |
|---|---|---|---|---|---|---|---|---|
| TYPE | R | R | R | R | R | R | R | R |
| IND. ADDR | 20 | 21 | 22 | 23 | 24 | 25 | 26 | 27 |
| BIT 7 | CNT7 | CNT7 | CNT7 | CNT7 | CNT7 | CNT7 | CNT7 | CNT7 |
| BIT 6 | CNT6 | CNT6 | CNT6 | CNT6 | CNT6 | CNT6 | CNT6 | CNT6 |
| BIT 5 | CNT5 | CNT5 | CNT5 | CNT5 | CNT5 | CNT5 | CNT5 | CNT5 |
| BIT 4 | CNT4 | CNT4 | CNT4 | CNT4 | CNT4 | CNT4 | CNT4 | CNT4 |
| BIT 3 | CNT3 | CNT3 | CNT3 | CNT3 | CNT3 | CNT3 | CNT3 | CNT3 |
| BIT 2 | CNT2 | CNT2 | CNT2 | CNT2 | CNT2 | CNT2 | CNT2 | CNT2 |
| BIT 1 | CNT1 | CNT1 | CNT1 | CNT1 | CNT1 | CNT1 | CNT1 | CNT1 |
| BIT 0 | CNT0 | CNT0 | CNT0 | CNT0 | CNT0 | CNT0 | CNT0 | CNT0 |

*FIG. 13*

| REGISTER | SERIAL MUX SELECT PORT 1 | SERIAL MUX SELECT PORT 2 | SERIAL MUX SELECT PORT 3 | SERIAL MUX SELECT PORT 4 | SERIAL MUX SELECT PORT 5 | SERIAL MUX SELECT PORT 6 | SERIAL MUX SELECT PORT 7 | SERIAL MUX SELECT PORT 8 |
|---|---|---|---|---|---|---|---|---|
| TYPE | R/W | R/W | R/W | R/W | R/W | R/W | R/W | R/W |
| IND. ADDR | 28 | 29 | 2A | 2B | 2C | 2D | 2E | 2F |
| BIT 7 | 0 | 0 | 0 | 0 | 0 | 0 | 0 | 0 |
| BIT 6 | 0 | 0 | 0 | 0 | 0 | 0 | 0 | 0 |
| BIT 5 | 0 | 0 | 0 | 0 | 0 | 0 | 0 | 0 |
| BIT 4 | 0 | 0 | 0 | 0 | 0 | 0 | 0 | 0 |
| BIT 3 | 0 | 0 | 0 | 0 | 0 | 0 | 0 | 0 |
| BIT 2 | SEL2 | SEL2 | SEL2 | SEL2 | SEL2 | SEL2 | SEL2 | SEL2 |
| BIT 1 | SEL1 | SEL1 | SEL1 | SEL1 | SEL1 | SEL1 | SEL1 | SEL1 |
| BIT 0 | SEL0 | SEL0 | SEL0 | SEL0 | SEL0 | SEL0 | SEL0 | SEL0 |

FIG. 14

| REGISTER | MODE CONTROL | SWITCH-OVER CONTROL | SWITCH-OVER IDLE LIMIT | BACK-PRESSURE CONTROL | PLL MIN | PLL MAX | RAM BIST CONTROL | RAM BIST RESULTS PRAM1-8 | RAM BIST RESULTS SRAM1-4 |
|---|---|---|---|---|---|---|---|---|---|
| TYPE | R/W | R/W | R/W | R/W | R | R | R/W | R | R |
| IND. ADDR | 30 | 31 | 32 | 33 | 34 | 35 | 36 | 37 | 38 |
| BIT 7 | SW_RST | PD_ENB | LIM7 | 0 | 0 | 0 | DONE* | FAIL8 | 0 |
| BIT 6 | PARITY_EN | SW_SF | LIM6 | 0 | MIN6 | MAX6 | 0 | FAIL7 | 0 |
| BIT 5 | PD | EN_RESYNC | LIM5 | 0 | MIN5 | MAX5 | 0 | FAIL6 | 0 |
| BIT 4 | PLL_DIS | EN_HW_SW | LIM4 | 0 | MIN4 | MAX4 | 0 | FAIL5 | 0 |
| BIT 3 | reserved | EN_HW_BP | LIM3 | 0 | MIN3 | MAX3 | BRESETN | FAIL4 | FAIL4 |
| BIT 2 | SWITCH | TSEL2 | LIM2 | 0 | MIN2 | MAX2 | MODE1 | FAIL3 | FAIL3 |
| BIT 1 | SER_RST | TSEL1 | LIM1 | BP_VALUE | MIN1 | MAX1 | MODE1 | FAIL2 | FAIL2 |
| BIT 0 | START | TSEL0 | LIM0 | FORCE_BP | MIN0 | MAX0 | MODE0 | FAIL1 | FAIL1 |

FIG. 15

| BYTE # | 7 | 6 | 5 | 4 | 3 | 2 | 1 | 0 |
|---|---|---|---|---|---|---|---|---|
| 1 | node tag header ||||||||
| 2 | " ||||||||
| 3 | " ||||||||
| 4 | " ||||||||
| 5 | " ||||||||
| 6 | " ||||||||
| 7 | " ||||||||
| 8 | " ||||||||
| 9 | " ||||||||
| 10 | " ||||||||
| 11 | " ||||||||
| 12 | " ||||||||
| 13 | " ||||||||
| 14 | " ||||||||
| 15 | " ||||||||
| 16 | " ||||||||
| 17-64 | payload (1:48) ||||||||
| 65 | 0 | 0 | 0 | 0 | 0 | 0 | 0 | 0 |
| 66 | 0 | 0 | 0 | 0 | 0 | 0 | 0 | 0 |
| 67 | 0 | 0 | 0 | 0 | 0 | 0 | 0 | 0 |
| 68 | 0 | 0 | 0 | 0 | 0 | 0 | 0 | 0 |

| BYTE # | 7 | 6 | 5 | 4 | 3 | 2 | 1 | 0 |
|---|---|---|---|---|---|---|---|---|
| 1 | 0 | 0 | 0 | 0 | 0 | 0 | 0 | 0 |
| 2 | 0 | 0 | 0 | 0 | 0 | 0 | 0 | 0 |
| 3 | 1 | 1 | 1 | 1 | 1 | 1 | 1 | 1 |
| 4-68 | 0 | 0 | 0 | 0 | 0 | 0 | 0 | 0 |

FIG. 18

| | 7 | 6 | 5 | 4 | 3 | 2 | 1 | 0 |
|---|---|---|---|---|---|---|---|---|
| BYTE 1 | 0 | 0 | 0 | 0 | 1 | 1 | 1 | 1 |
| BYTE 2 | 0 | 0 | 1 | 1 | 0 | 0 | 1 | 1 |
| BYTE 3 | 0 | 1 | 0 | 1 | 0 | 1 | 0 | 1 |
| BIP-8 | 1 | 0 | 0 | 1 | 0 | 1 | 1 | 0 |

| RESULT | 1 | 1 | 1 | 1 | 1 | 1 | 1 | 1 |
|---|---|---|---|---|---|---|---|---|

FIG. 19

CELL COMBINATION TO UTILIZE AVAILABLE SWITCH BANDWIDTH

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

Network switches provide signal connections between a plurality of input ports and a plurality of output ports. Each network switch typically comprises at least one switch fabric for facilitating these signal connections. The signal connections are made between the switch fabric and the input ports and the output ports.

Each switch fabric is typically located on its own printed circuit board within the network switch. Likewise, any circuitry that is associated with the input ports and the output ports is typically located on separate printed circuit boards within the network switch. A motherboard or backplane is provided in order for the signal connections to be made between the switch fabric and the input ports and the output ports. That is, the backplane provides physical connections between the switch fabric and the input ports and the output ports. It is over these physical connections that the signal connections are made.

Depending on the size of the network switch, it may be required that a large number of signal connections must be made between the switch fabric and the input ports and the output ports, and, correspondingly, a large number of physical connections must be made across the backplane between the switch fabric printed circuit board and the printed circuit board(s) associated with the input ports and the output ports. There are problems associated with such a large number of physical connections being made across a backplane, including printed circuit board area limitations and signal noise interference. Accordingly, it would be beneficial to reduce the number of physical connections that must be made across the backplane between the switch fabric printed circuit board and the printed circuit board(s) associated with the input ports and the output ports, while not reducing the data rate associated with the signal connections.

In addition to the benefit of reducing the number of physical connections between the switch fabric printed circuit board and the printed circuit board(s) associated with the input ports and the output ports, it would also be beneficial to utilize the reduced number of physical connections in a most efficient manner. That is, it would be beneficial to utilize the reduced number of physical connections between the switch fabric printed circuit board and the printed circuit board(s) associated with the input ports and the output ports in an efficient manner so that signal connections may be made to provide for signal redundancy and to compensate for hardware failures. Accordingly, it would be desirable to provide an apparatus and method for efficiently transferring data across a backplane in a network switch.

Some switch devices have plural elements which require access to a switch fabric, yet these elements collectively require an amount of bandwidth which does not exceed the bandwidth provided by a single thread through the switch fabric. Therefore, it would be beneficial to be able to make such network elements share the single thread, while ensuring that their collective bandwidth does not exceed the available thread bandwidth.

SUMMARY OF THE INVENTION

The present invention is directed to an apparatus and method for efficiently transferring asynchronous transfer mode (ATM) cells across a backplane in a network switch. The present invention is realized through an electrical apparatus that converts parallel data that is received on parallel data input ports to serial data that is transmitted on serial data output ports. The parallel data that is received on each parallel data input port is divided and transmitted from a corresponding pair of serial data output ports. The electrical apparatus also converts serial data that is received on serial data input ports to parallel data that is transmitted on parallel data output ports. The serial data that is received on a corresponding pair of serial data input ports is combined and transmitted from a parallel data output port.

In addition to converting parallel input data to serial output data and converting serial input data to parallel output data, the electrical apparatus can direct converted parallel input data from any of the parallel data input ports to any of the corresponding pairs of serial data output ports and can direct converted serial input data from any of the corresponding pairs of serial data input ports to any of the parallel data output ports.

The electrical apparatus can also direct converted parallel input data from any of the parallel data input ports to more than one of the corresponding pairs of serial data output ports. The electrical apparatus can also direct converted serial input data from any of the corresponding pairs of serial data input ports to more than one parallel data output ports.

The electrical apparatus can further direct converted serial input data from more than one of the corresponding pairs of serial data input ports to a single parallel data output port. The electrical apparatus can also direct converted parallel input data from a single parallel data input port to either of one or another of the corresponding pairs of serial data output ports according to the value of a switching bit in a cell header of the converted parallel input data.

The above-described functions of the electrical apparatus allow the number of physical connections that must be made across a backplane in a network switch to be reduced, while not reducing the data rate associated with signal connections utilizing those physical connections. Furthermore, the above-described functions of the electrical apparatus allow the reduced number of physical connections to be used in an efficient manner so that signal connections may be made to provide for signal redundancy and to compensate for hardware failures in the network switch.

By enabling plural serial input ports to access a single parallel output port, plural network switch elements can share a single thread through a switch fabric. In particular, the present invention finds use in interleaving the relatively low bandwidth cell outputs of two central control processors onto a single thread. This thread is routed through an interconnected switch fabric. Certain of these cells originated by a first of the central control processors, destined for a second of the central control processors, are routed through the switch fabric as part of the interleaved cells and are subsequently separated from other cells, according to one or more bits set in a header portion of each cell, enabling routing to the second central control processor.

Other objects, features, and advantages, of the present invention will become readily apparent from the following detailed description which is to be read in conjunction with the appended drawings.

BRIEF DESCRIPTION OF THE DRAWINGS

The invention will be more fully understood by reference to the following detailed description of the invention in conjunction with the following drawings of which:

FIG. 8 is a register map of the DATA register, the INDIRECT READ ADDRESS register, and the INDIRECT WRITE ADDRESS register for the electrical apparatus shown in FIG. 1;

FIG. 9 is a register map of a PARALLEL PORT ENABLE register, a PARALLEL PORT LOOPBACK register, a PARALLEL LOSS OF CLOCK STATUS register, a PARALLEL LOSS OF CLOCK MASK register, a PARALLEL SOC ERROR STATUS register, a PARALLEL SOC ERROR MASK register, a PARALLEL PARITY ERROR STATUS register, and a PARALLEL PARITY ERROR MASK register for the electrical apparatus shown in FIG. 1;

FIG. 10 is a register map of the PARALLEL CELL ERROR COUNTER registers for each parallel data input port of the electrical apparatus shown in FIG. 1;

FIG. 11 is a register map of the PARALLEL MUX SELECT registers for each serial data output port of the electrical apparatus shown in FIG. 1;

FIG. 12 is a register map of a SERIAL PORT ENABLE register, a SERIAL PORT LOOPBACK register, a SERIAL PORT STATUS register, a SERIAL PORT STATUS MASK register, a SERIAL BIP-8 ERROR register, a SERIAL BIP-8 ERROR MASK register, a SYNC DECODE NORMAL register, and a SYNC DECODE SWITCH register for the electrical apparatus shown in FIG. 1;

FIG. 13 is a register map of the SERIAL CELL ERROR COUNTER registers for each serial data input port of the electrical apparatus shown in FIG. 1;

FIG. 14 is a register map of the SERIAL MUX SELECT registers for each parallel data output port of the electrical apparatus shown in FIG. 1;

FIG. 15 is a register map of a MODE CONTROL register, a SWITCH-OVER CONTROL register, a SWITCH-OVER IDLE LIMIT register, a BACK-PRESSURE CONTROL register, a PLL MINIMUM register, a PLL MAXIMUM register, a RAM BIST CONTROL register, a RAM BIST RESULTS PRAM1–8 register, and a RAM BIST RESULTS SRAM1–4 register for the electrical apparatus shown in FIG. 1;

FIG. 18 shows the format of an ATM idle cell that may be generated for transmission across parallel data lines by an ASIC incorporating the capabilities of the electrical apparatus shown in FIG. 1;

FIG. 19 shows how BIP-8 parity is derived;

DETAILED DESCRIPTION OF THE INVENTION

Figure 1:
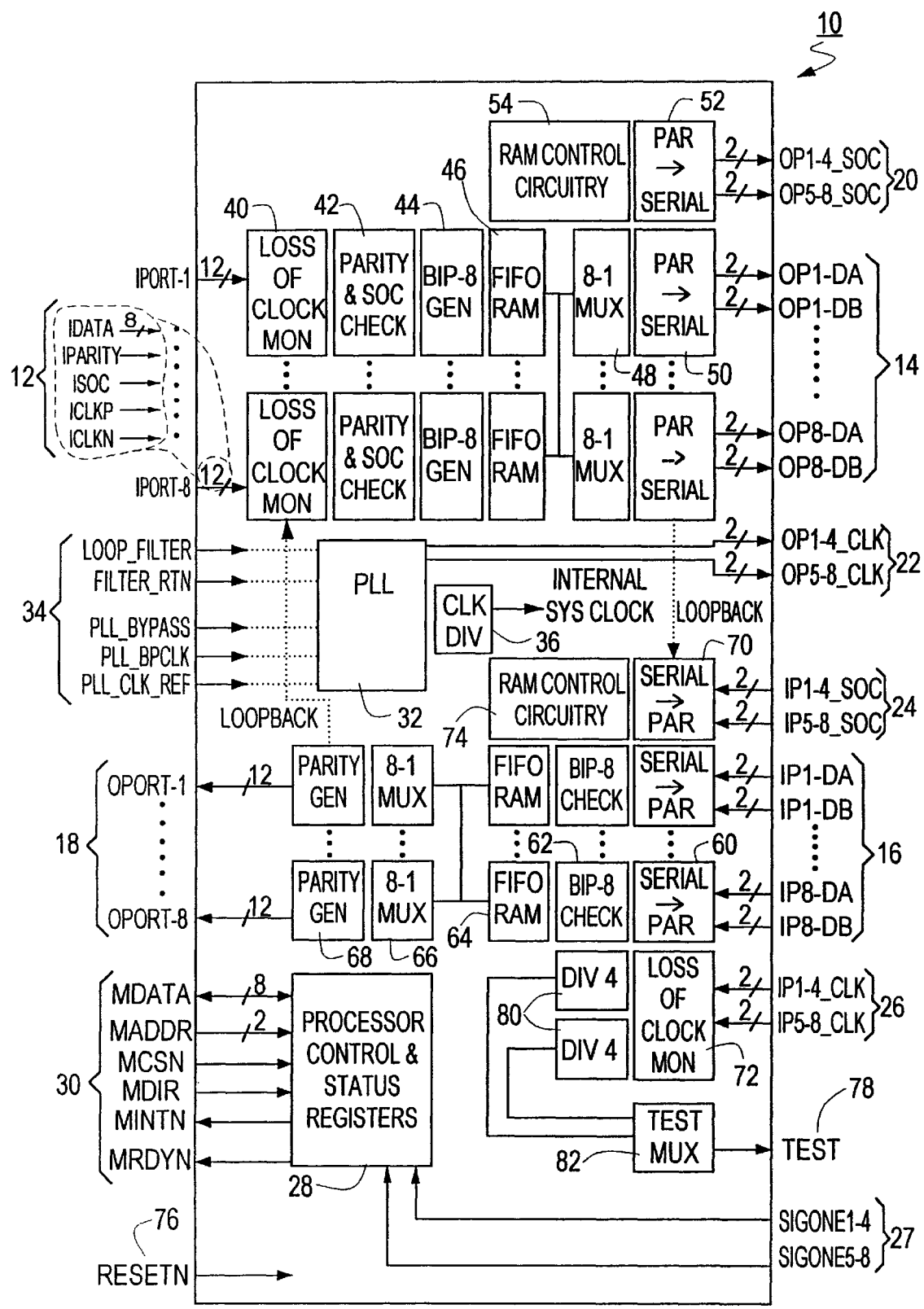
FIG. 1 is a functional block diagram of an electrical apparatus which may be used for transferring ATM cells across a backplane in a network switch according to the present invention.

Referring to FIG. 1, there is shown a functional block diagram of an electrical apparatus 10 which may be used for transferring asynchronous transfer mode (ATM) cells across a backplane in a network switch according to the present invention. The electrical apparatus 10 may be provided in either discrete or integrated circuit form and is capable of operating in a high speed ATM network switch.

The electrical apparatus 10 receives parallel data signals on eight parallel data input ports (IPORT-1 through IPORT-8) 12 and transmits serial data signals on sixteen serial data output ports (OP1-DA, OP1-DB through OP8-DA, OP8-DB) 14. The electrical apparatus 10 also receives serial data signals on sixteen serial data input ports (IP1-DA, IP1-DB through IP8-DA, IP8-DB) 16 and transmits parallel data signals on eight parallel data output ports (OPORT-1 through OPORT-8) 18.

It should be noted that the sixteen serial data output ports 14 are paired together so as to form eight corresponding pairs of serial data output ports (for example, OP1-DA and OP1-DB make up a corresponding pair). It should also be noted that the sixteen serial data input ports 16 are paired together so as to form eight corresponding pairs of serial data input ports (for example, IP1-DA and IP1-DB make up a corresponding pair).

As indicated in FIG. 1, each of the eight parallel data input ports 12 comprises eight data signal lines (IDATA), a parity signal line (IPARITY), a start-of-cell signal line (ISOC), and two differential clock signal lines (ICLKP, ICLKN). Each of the eight parallel data output ports 18 comprises similar signal lines (ODATA, OPARITY, OSOC, OCLKP, and OCLKN).

Each of the sixteen serial data output ports 14 comprises two differential data signal lines. The sixteen serial data output ports 14 share common start-of-cell signals (OP1–4_SOC, OP5–8_SOC) 20 and clock signals (OP1–4_CLK, OP5–8_CLK) 22. That is, the first eight of the sixteen serial data output ports (OP1-DA, OP1-DB through OP4-DA, OP4-DB) share common start-of-cell signal OP1–4_SOC and clock signal OP1–4_CLK, and the second eight of the sixteen serial data output ports (OP5-DA, OP5-DB through OP8-DA, OP8-DB) share common start-of-cell signal OP5–8_SOC and clock signal OP5–8_CLK. The start-of-cell signals (OP1–4_SOC, OP5–8_SOC) 20 and clock signals (OP1–4_CLK, OP5–8_CLK) 22 are differential signals requiring two signal lines.

Each of the sixteen serial data input ports 16 comprises two differential data signal lines. The sixteen serial data input ports 16 share common start-of-cell signals (IP1–4_SOC, IP5–8_SOC) 24 and clock signals (IP1–4_CLK, IP5–8_CLK) 26. That is, the first eight of the sixteen serial data input ports (IP1-DA, IP1-DB through IP4-DA, IP4-DB) share common start-of-cell signal IP1–4_SOC and clock signal IP1–4_CLK, and the second eight of the sixteen serial data input ports (IP5-DA, IP5-DB through IP8-DA, IP8-DB) share common start-of-cell signal IP5–8_SOC and clock signal IP5–8_CLK. The start-of-cell signals (IP1–4_SOC, IP5–8_SOC) 24 and clock signals (IP1–4_CLK, IP5–8_CLK) 26 are differential signals requiring two signal lines.

The sixteen serial data input ports 16, the common start-of-cell signals 24, and the common clock signals 26 share common serial input gone signals (SIGONE1–4, SIGONE5–8) 27. That is, the first eight of the sixteen serial data input ports (IP1-DA, IP1-DB thru IP4-DA, IP4-DB) and the associated common start-of-cell signal (IP1–4_SOC) and common clock signal (IP1–4_CLK) share common serial input gone signal SIGONE1–4, and the second eight of the sixteen serial data input ports (IP5-DA, IP5-DB thru IP8-DA, IP8-DB) and the associated common start-of-cell signal (IP5–8_SOC) and common clock signal (IP5–8_CLK) share common serial input gone signal SIGONE5–8. The serial input gone signals (SIGONE1–4, SIGONE5–8) 27 indicate that all of the serial data input signals in a group (for example, IP1-DA, IP1-DB thru IP4-DA, IP4-DB; IP1–4_SOC; and IP1–4_CLK) are gone (i.e., whatever circuitry was driving these signals is no longer present). The serial input gone signals (SIGONE1–4, SIGONE5–8) 27 are pulled-up within the electrical apparatus 10 to make these signals active high, meaning that when these signals are high, the circuitry that was driving these signals is no longer present.

The electrical apparatus 10 converts parallel data that is received on parallel data input ports (IPORT-1 through IPORT-8) 12 to serial data that is transmitted on serial data output ports (OP1-DA, OP1-DB through OP8-DA, OP8-DB) 14. The parallel data that is received on each parallel data input port (for example, IPORT-1) is divided and transmitted from one of the corresponding pairs of serial data output ports (for example, OP1-DA and OP1-DB). That is, each eight-bit byte that is received on a parallel data input port is divided into two four-bit nibbles which are then transmitted serially from one of the corresponding pairs of serial data output ports.

The electrical apparatus 10 also converts serial data that is received on serial data input ports (IP1-DA, IP1-DB through IP8-DA, IP8-DB) 16 to parallel data that is transmitted on parallel data output ports (OPORT-1 through OPORT-8) 18. The serial data that is received on one of the corresponding pairs of serial data input ports (for example, IP1-DA and IP1-DB) is combined and transmitted from a parallel data output port (for example, OPORT-1). That is, each four-bit nibble of data that is received on a serial data input port is combined with another four-bit nibble of data that is received on a corresponding serial data input port and then the combined data is transmitted as an eight-bit byte from a parallel data output port.

In addition to converting parallel input data to serial output data and converting serial input data to parallel output data, the electrical apparatus 10 can direct converted parallel input data from any of the parallel data input ports 12 to any of the corresponding pairs of serial data output ports 14 and can direct converted serial input data from any of the corresponding pairs of serial data input ports 16 to any of the parallel data output ports 18.

The electrical apparatus 10 can also direct converted parallel input data from any of the parallel data input ports 12 to more than one of the corresponding pairs of serial data output ports 14. The electrical apparatus 10 can also direct converted serial input data from any of the corresponding pairs of serial data input ports 16 to more than one parallel data output ports 18.

The electrical apparatus 10 can further direct converted serial input data from more than one of the corresponding pairs of serial data input ports 16 to a single parallel data output port 18. The electrical apparatus 10 can further direct converted parallel input data from a single parallel data input port 12 to either of one or another of the corresponding pairs of serial data output ports 14 according to the value of a switching bit in a cell header of the converted parallel input data.

The electrical apparatus 10 comprises processor control and status registers 28 for controlling the above-described functions. The processor control and status registers 28, which are interfaced through a plurality of control signal lines 30, allow an external system processor (not shown) to control the flow of ATM data cells through the electrical apparatus 10. The control signal lines 30 comprise eight data signal lines (MDATA), two address signal lines (MADDR), a chip select signal line (MCSN), a data direction signal line (MDIR), an interrupt signal line (MINTN), and a data ready signal line (MRDYN).

Associated with each parallel data input port 12 is a loss of clock monitor circuit 40, a parity and start-of-cell (SOC) check circuit 42, a bit interleaved parity (BIP-8) generator circuit 44, and a FIFO RAM 46. Associated with each of the corresponding pairs of serial data output ports 14 is an 8-to-1 multiplexer 48 and a parallel-to-serial converter 50. A parallel-to-serial converter 52 is also associated with the common start-of-cell signals (OP1–4_SOC, OP5–8_SOC) 20. RAM control circuitry 54 is provided to control the one-cell FIFO RAM 46 and to assist the processor control and status registers 28 in controlling the flow of ATM data cells from the parallel data input ports 12 to the serial data output ports 14.

The electrical apparatus 10 comprises a phase-locked-loop (PLL) circuit 32 for generating the clock signals OP1–4_CLK and OP5–8_CLK 22. The PLL circuit 32 is controlled by external components (not shown) through a plurality of control signal lines 34, which include a loop filter signal line (LOOP_FILTER), a loop filter return signal line (FILTER_RTN), a phase-locked-loop bypass signal line (PLL_BYPASS), a phase-locked-loop bypass clock signal line (PLL_BPCLK), and a phase-locked-loop clock reference signal line (PLL_CLK_REF). The PLL circuit 32, along with a clock divide circuit 36, provides an internal system clock signal for the electrical apparatus 10.

Associated with each of the corresponding pairs of serial data input ports 16 is a serial-to-parallel converter 60, a BIP-8 check circuit 62, and a 2-cell FIFO RAM 64. Associated with each parallel data output port 18 is an 8-to-1 multiplexer 66 and a parity generator circuit 68. A serial-to-parallel converter 70 is also associated with the common start-of-cell signals (IP1–4_SOC, IP5–8_SOC) 24, and a loss of clock monitor circuit 72 is associated with the common clock signals (IP1–4_CLK, IP5–8_CLK) 26. RAM control circuitry 74 is provided to control the 2-cell FIFO RAM 64 and to assist the processor control and status registers 28 in controlling the flow of ATM data cells from the serial data input ports 16 to the parallel data output ports 18.

It should be noted that a reset signal line (RESETN) 76 is provided for resetting all of the circuitry within the electrical apparatus 10, and a test signal line (TEST) 78 is provided for monitoring the common clock signals (IP1–4_CLK, IP5–8_CLK) 26 after they have been processed by divide-by-four circuits 80 and passed through a test multiplexer 82. It should be also noted that other signals may be monitored via the test signal line (TEST) 78, as described in more detail below.

Figure 2:
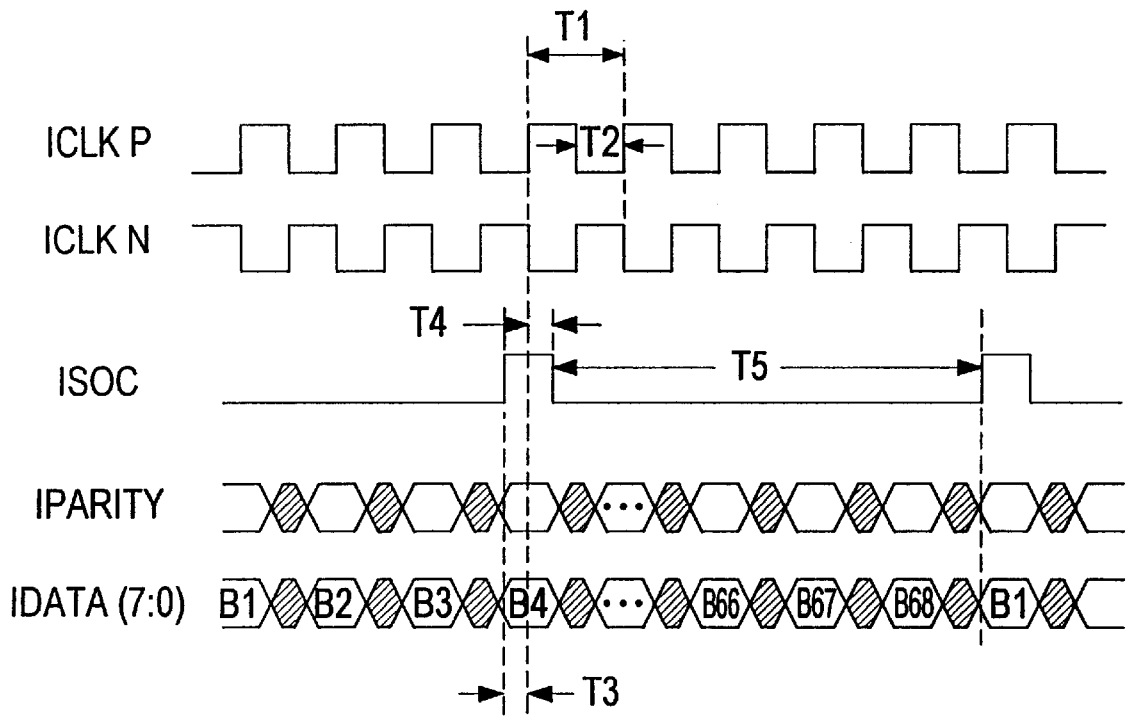
FIG. 2 is an interface timing diagram for the parallel data input ports of the electrical apparatus shown in FIG. 1.

Referring to FIG. 2, there is shown an interface timing diagram for the parallel data input ports (IPORT-1 through IPORT-8) 12. Each eight-bit byte in a data cell is represented by B1, B2, B3, and so on. Typical timing ranges are also provided.

Figure 3:
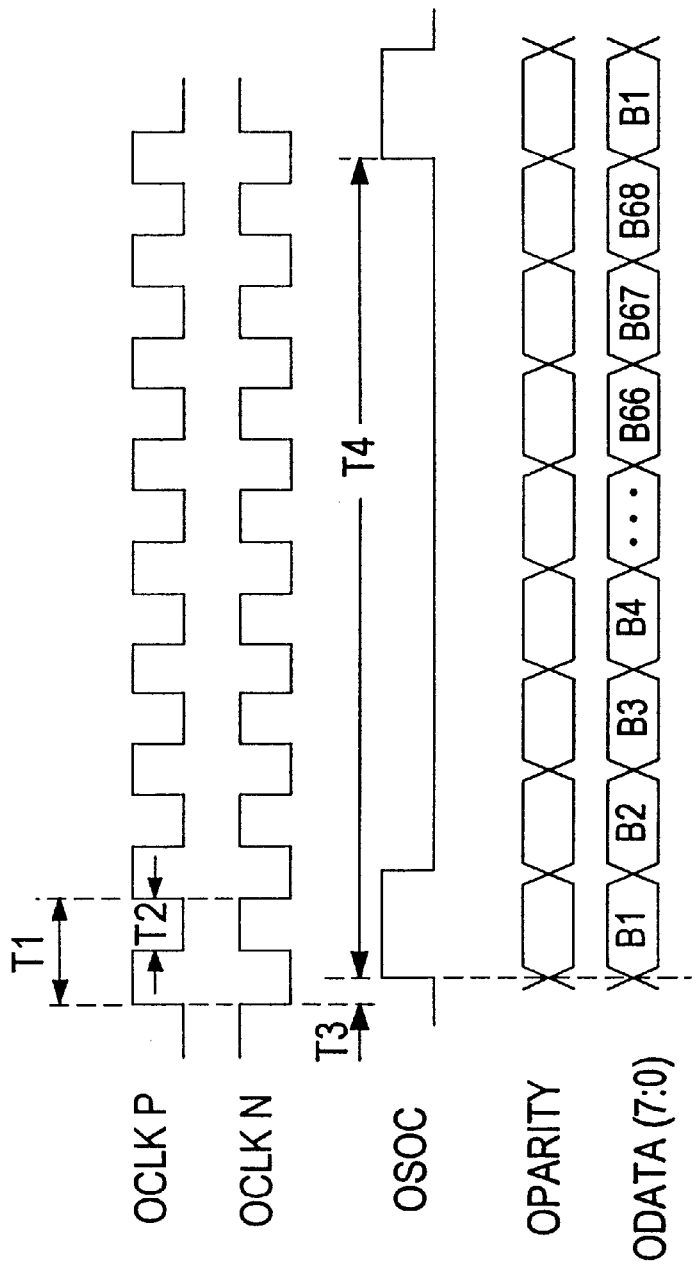
FIG. 3 is an interface timing diagram for the parallel data output ports of the electrical apparatus shown in FIG. 1.

Referring to FIG. 3, there is shown an interface timing diagram for the parallel data output ports (OPORT-1 through OPORT-8) 18. Each eight-bit byte in a data cell is represented by B1, B2, B3, and so on. Typical timing ranges are also provided.

Figure 4:
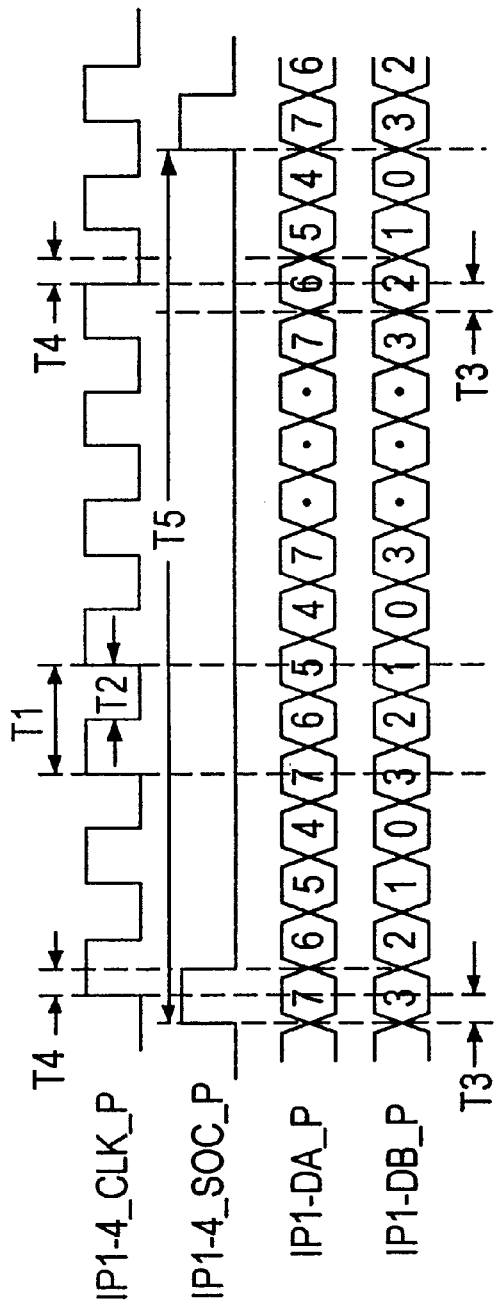
FIG. 4 is an interface timing diagram for the serial data input ports of the electrical apparatus shown in FIG. 1.

Referring to FIG. 4, there is shown an interface timing diagram for the serial data input ports (IP1-DA, IP1-DB through IP8-DA, IP8-DB) 16. Each bit in a data cell is represented by 7, 6, 5, and so on. For simplicity of the diagram, only the positive signal of each differential pair is shown. Typical timing ranges are also provided.

Figure 5:
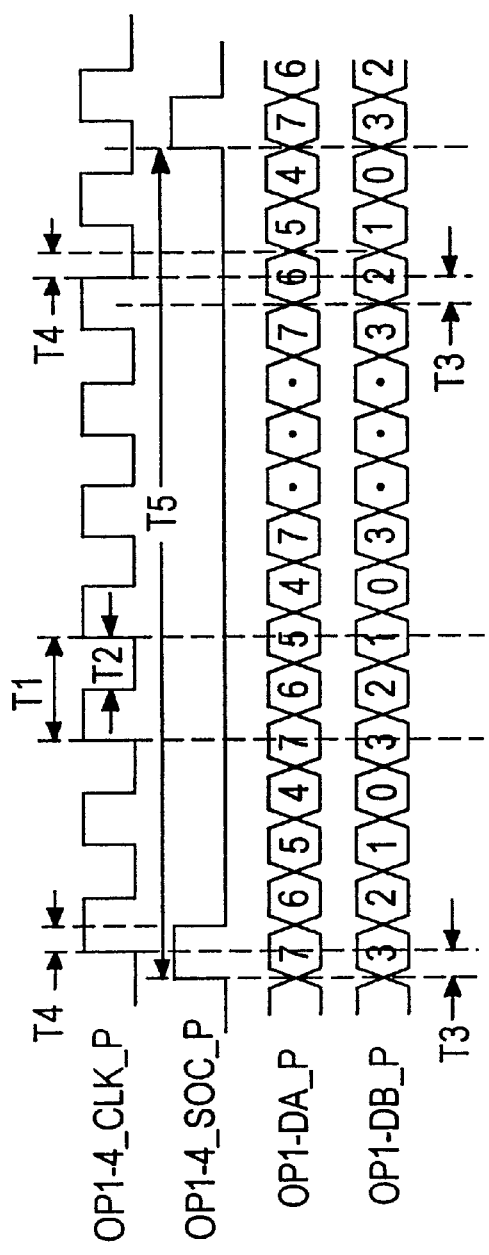
FIG. 5 is an interface timing diagram for the serial data output ports of the electrical apparatus shown in FIG. 1.

Referring to FIG. 5, there is shown an interface timing diagram for the serial data output ports (OP1-DA, OP1-DB through OP8-DA, OP8-DB) 14. Each bit in a data cell is represented by 7, 6, 5, and so on. For simplicity of the diagram, only the positive signal of each differential pair is shown. Typical timing ranges are also provided.

Figure 6:
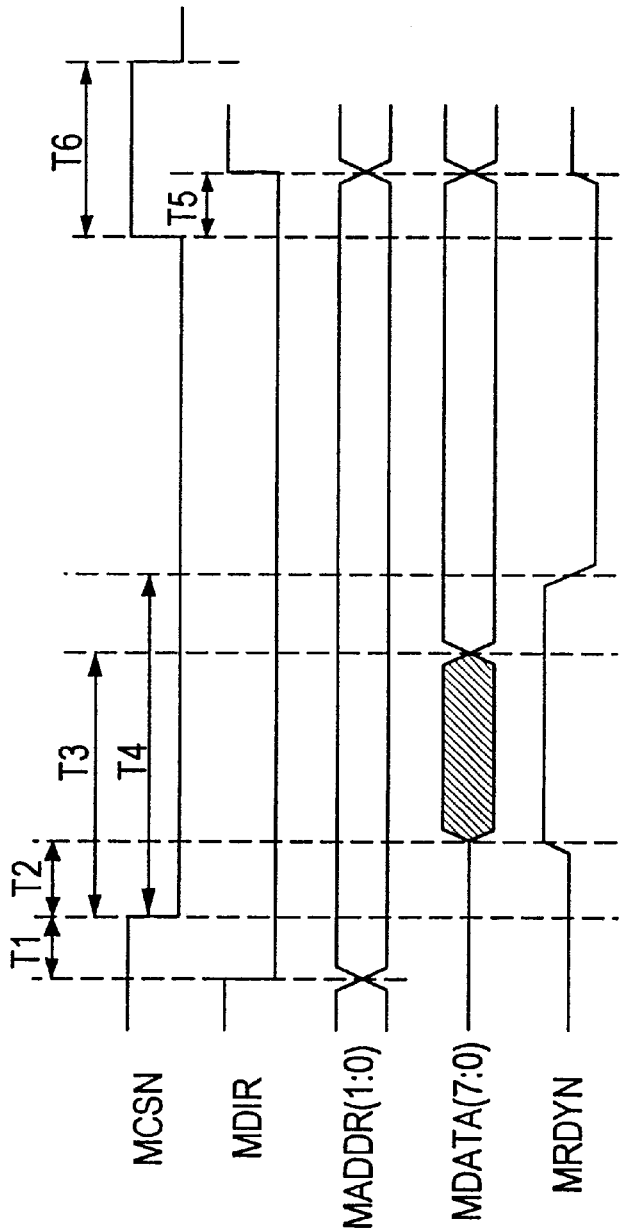
FIG. 6 is an interface timing diagram for reading from the processor control and status registers of the electrical apparatus shown in FIG. 1.

Referring to FIG. 6, there is shown an interface timing diagram for reading from the processor control and status registers 28. Typical timing ranges are also provided.

Figure 7:
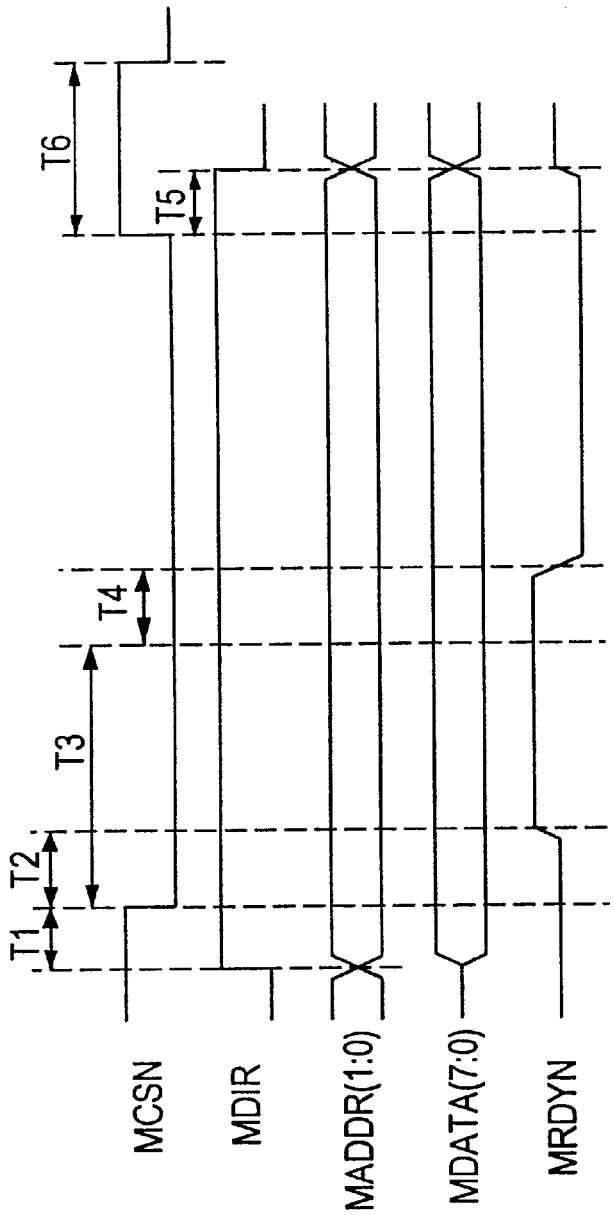
FIG. 7 is an interface timing diagram for writing to the processor control and status registers of the electrical apparatus shown in FIG. 1.

Referring to FIG. 7, there is shown an interface timing diagram for writing to the processor control and status registers 28. Typical timing ranges are also provided.

As mentioned above, the processor control and status registers 28 allow an external system processor (not shown) to control the flow of ATM data cells through the electrical apparatus 10. There are a total of fifty-seven processor control and status registers 28. All of these processor control and status registers 28 are accessible through three directly addressable registers: a DATA register, an INDIRECT READ ADDRESS register, and an INDIRECT WRITE ADDRESS register.

Referring to FIG. 8, there is shown a register map of the DATA register, the INDIRECT READ ADDRESS register, and the INDIRECT WRITE ADDRESS register. All three of these directly addressable registers have read/write capability. However, writing to the INDIRECT READ ADDRESS register will overwrite the DATA register.

To write to one of the processor control and status registers 28, the write data must be written into the DATA register, and the address of the particular processor control and status register must be written into the INDIRECT WRITE ADDRESS register. The electrical apparatus 10 will then transfer the write data from the DATA register to the particular processor control and status register.

To read from one of the processor control and status registers 28, the address of the particular processor control and status register must be written into the INDIRECT READ ADDRESS register. The electrical apparatus 10 will then transfer the read data from the particular processor control and status register to the DATA register.

Referring to FIG. 9, there is shown a register map of a PARALLEL PORT ENABLE register, a PARALLEL PORT LOOPBACK register, a PARALLEL LOSS OF CLOCK STATUS register, a PARALLEL LOSS OF CLOCK MASK register, a PARALLEL SOC ERROR STATUS register, a PARALLEL SOC ERROR MASK register, a PARALLEL PARITY ERROR STATUS register, and a PARALLEL PARITY ERROR MASK register.

A bit in the PARALLEL PORT ENABLE register is set to allow data traffic to flow from a particular parallel data input port 12. When a particular parallel data input port 12 is disabled, all error monitoring for that port is also disabled. However, the current status bits (see below) for that port remain unchanged when it is disabled. Also, each parallel data input port 12 should be disabled before being put into loopback mode (see below). After being put into loopback mode, a parallel data input port 12 should be enabled to allow loopback traffic to flow. The bits in the PARALLEL PORT ENABLE register default to 00 hex.

A bit in the PARALLEL PORT LOOPBACK register is set to place a particular parallel data input port 12 into loopback mode. When in loopback mode, the particular parallel data input port 12 will ignore any received parallel data (IDATA), parity (IPARITY), start-of-cell (ISOC), and differential clock (ICLKP, ICLKN) signals. The particular parallel data input port 12 will instead allow data traffic from a corresponding parallel data output port 18 to flow from the particular parallel data input port 12. That is, for example, when parallel data input port IPORT-1 is placed in loopback mode, the received parallel data (IDATA), parity (IPARITY), start-of-cell (ISOC), and differential clock (ICLKP, ICLKN) signals will be ignored and the transmitted parallel data (ODATA), parity (OPARITY), start-of-cell (OSOC), and differential clock (OCLKP, OCLKN) signals from parallel data output port OPORT-1 will instead flow from parallel data input port IPORT-1. It should be noted that the transmitted parallel data (ODATA), parity (OPARITY), start-of-cell (OSOC), and differential clock (OCLKP, OCLKN) signals from parallel data output port OPORT-1 will still be transmitted from parallel data output port OPORT-1. The bits in the PARALLEL PORT LOOPBACK register default to 00 hex.

A bit in the PARALLEL LOSS OF CLOCK STATUS register is set when a particular parallel data input port clock signal (ICLKP, ICLKN) does not toggle. The PARALLEL LOSS OF CLOCK STATUS register bits are cleared on read if the particular parallel data input port clock signal (ICLKP, ICLKN) returns. The PARALLEL LOSS OF CLOCK STATUS register bits are written to for diagnostic purposes only. The bits in the PARALLEL LOSS OF CLOCK STATUS register default to 00 hex.

A bit in the PARALLEL LOSS OF CLOCK MASK register is set to cause an interrupt (MINTN) when a particular parallel data input port clock signal (ICLKP, ICLKN) does not toggle. The bits in the PARALLEL LOSS OF CLOCK MASK register default to 00 hex.

A bit in the PARALLEL SOC ERROR STATUS register is set when a particular parallel data input port start-of-cell signal (ISOC) is detected out of place. The PARALLEL SOC ERROR STATUS register bits are cleared on read. The PARALLEL SOC ERROR STATUS register bits are written to for diagnostic purposes only. The bits in the PARALLEL SOC ERROR STATUS register default to 00 hex.

A bit in the PARALLEL SOC ERROR MASK register is set to cause an interrupt (MINTN) when a particular parallel data input port start-of-cell signal (ISOC) is detected out of place. The bits in the PARALLEL SOC ERROR MASK register default to 00 hex.

A bit in the PARALLEL PARITY ERROR STATUS register is set when a parity error is detected on a particular parallel data input port. A parity error also increments the PARALLEL CELL ERR COUNTER register (see below). The PARALLEL PARITY ERROR STATUS register bits are cleared on read. The PARALLEL PARITY ERROR STATUS register bits are written to for diagnostic purposes only. The bits in the PARALLEL PARITY ERROR STATUS register default to 00 hex.

A bit in the PARALLEL PARITY ERROR MASK register is set to cause an interrupt (MINTN) when a parity error is detected on a particular parallel data input port. The bits in the PARALLEL PARITY ERROR MASK register default to 00 hex.

Referring to FIG. 10, there is shown a register map of the PARALLEL CELL ERROR COUNTER registers for each parallel data input port 12. A PARALLEL CELL ERROR COUNTER register is incremented when a cell is received with a parity error on a corresponding parallel data input port 12. The PARALLEL CELL ERROR COUNTER registers do not roll over, they lock at the top. The PARALLEL CELL ERROR COUNTER registers reset on read.

Referring to FIG. 11, there is shown a register map of the PARALLEL MUX SELECT registers for each serial data output port 14. The bits in the PARALLEL MUX SELECT registers (SEL(2:0)) are set to select which particular parallel data input port 12 will provide data traffic to a particular serial data output port 14. The bits in the PARALLEL MUX SELECT registers are decoded as follows:

| SEL(2:0) | PARALLEL PORT |
|---|---|
| 0 | 1 |
| 1 | 2 |
| 2 | 3 |
| 3 | 4 |
| 4 | 5 |
| 5 | 6 |
| 6 | 7 |
| 7 | 8 |

Referring to FIG. 12, there is shown a register map of a SERIAL PORT ENABLE register, a SERIAL PORT LOOPBACK register, a SERIAL PORT STATUS register, a SERIAL PORT STATUS MASK register, a SERIAL BIP-8 ERROR register, a SERIAL BIP-8 ERROR MASK register, a SYNC DECODE NORMAL register, and a SYNC DECODE SWITCH register.

A bit in the SERIAL PORT ENABLE register is set to allow data traffic to flow from a particular serial data input port 16. When a particular serial data input port 16 is disabled, all error monitoring for that port is also disabled. However, the current status bits (see below) for that port remain unchanged when it is disabled. Also, each serial data input port 16 should be disabled before being put into loopback mode (see below). After being put into loopback mode, a serial data input port 16 should be enabled to allow loopback traffic to flow. The bits in the SERIAL PORT ENABLE register default to 00 hex.

A bit in the SERIAL PORT LOOPBACK register is set to place a particular group of serial data input ports 16 into loopback mode. When in loopback mode, the particular group of serial data input ports 16 will ignore any received serial data (for example, on serial data input ports IP1-DA, IP1-DB through IP4-DA, IP4-DB), start-of-cell (for example, IP1–4_SOC), and clock (for example, IP1–4_CLK) signals. The particular group of serial data input ports 16 will instead allow data traffic from a corresponding group of serial data output ports 14 to flow from the particular group of serial data input ports 16. That is, for example, when serial data input ports IP1-DA, IP1-DB through IP4-DA, IP4-DB are placed in loopback mode, the received serial data (on serial data input ports IP1-DA, IP1-DB through IP4-DA, IP4-DB), start-of-cell (IP1–4_SOC), and differential clock (IP1–4_CLK) signals will be ignored and the transmitted serial data (on serial data output ports OP1-DA, OP1-DB through OP4-DA, OP4-DB), start-of-cell (OP1–4_SOC), and differential clock (OP1–4_CLK) signals from serial data output ports OP1-DA, OP1-DB through OP4-DA, OP4-DB will instead flow from serial data input ports IP1-DA, IP1-DB through IP4-DA, IP4-DB. It should be noted that the transmitted serial data (on serial data output ports OP1-DA, OP1-DB through OP4-DA, OP4-DB), start-of-cell (OP1–4_SOC), and differential clock (OP1–4_CLK) signals from serial data output ports OP1-DA, OP1-DB through OP4-DA, OP4-DB will still be transmitted from serial data output ports OP1-DA, OP1-DB through OP4-DA, OP4-DB. The bits in the SERIAL PORT LOOPBACK register default to 00 hex.

The LOSS OF CLOCK bits (1–4 LOC, 5–8 LOC) in the SERIAL PORT STATUS register are set when a serial data input port clock signal (IP1–4_CLK, IP5–8_CLK) does not toggle. The LOSS OF CLOCK bits are cleared on read if the serial data input port clock signal (IP1–4_CLK, IP5–8_CLK) returns. When a LOSS OF CLOCK bit is set for a particular serial data input port clock signal, the serial data input ports associated with that particular serial data input port clock signal are shut down. Those serial data input ports must be re-enabled if and when the serial data input port clock signal returns.

The SOC ERROR bits (1–4 SOC, 5–8 SOC) in the SERIAL PORT STATUS register are set when a serial data input port start-of-cell signal (IP1–4_SOC, IP5–8_SOC) is detected out of place. The SOC ERROR bits are cleared on read.

The GONE ERROR bits (1–4 GONE, 5–8 GONE) in the SERIAL PORT STATUS register are set when the serial input gone signals (SIGONE1–4, SIGONE5–8) are active high. As described above, the serial input gone signals (SIGONE1–4, SIGONE5–8) 27 indicate that all of the serial data input signals in a group (for example, IP1-DA, IP1-DB thru IP4-DA, IP4-DB; IP1–4_SOC; and IP1–4_CLK) are gone (i.e., whatever circuitry that was driving these signals is no longer present). The GONE ERROR bits are cleared on read if the serial input gone signals (SIGONE1–4, SIGONE5–8) are inactive low (i.e., whatever circuitry that was driving the serial data input signals has returned). When a GONE ERROR bit is set for a particular group of serial data input signals, the serial data input ports associated with that particular group of serial data input signals are shut down. Those serial data input ports must be re-enabled if and when the serial input gone signals (SIGONE1–4, SIGONE5–8) become inactive low and the associated GONE ERROR bits are cleared.

The OVERFLOW ERROR bits (1–4 OVER, 5–8 OVER) in the SERIAL PORT STATUS register are set when an overflow condition occurs in the 2-cell FIFO RAM 64. The OVERFLOW ERROR bits are cleared on read.

The LOSS OF CLOCK bits (1–4 LOC, 5–8 LOC) in the SERIAL PORT STATUS MASK register are set to cause an interrupt (MINTN) when a serial data input port clock signal (IP1–4_CLK, IP5–8_CLK) does not toggle.

The SOC ERROR bits (1–4 SOC, 5–8 SOC) in the SERIAL PORT STATUS MASK register are set to cause an interrupt (MINTN) when a serial data input port start-of-cell signal (IP1–4_SOC, IP5–8_SOC) is detected out of place.

The GONE ERROR bits (1–4 GONE, 5–8 GONE) in the SERIAL PORT STATUS MASK register are set to cause an interrupt (MINTN) when all of the serial data input signals in a group (for example, IP1-DA, IP1-DB through IP4-DA, IP4-DB; IP1–4_SOC; and IP1–4_CLK) are gone (i.e., whatever circuitry was driving these signals is no longer present).

The OVERFLOW ERROR bits (1–4 OVER, 5–8 OVER) in the SERIAL PORT STATUS MASK register are set to cause an interrupt (MINTN) when an overflow condition occurs in the 2-cell FIFO RAM 64.

A bit in the BIP-8 ERROR register is set when an incorrect BIP-8 is detected on a particular serial data input port. A BIP-8 error also increments the SERIAL CELL ERR COUNTER register (see below) The BIP-8 ERROR register bits are cleared on read. The BIP-8 ERROR register bits are written to for diagnostic purposes only. The bits in the BIP-8 ERROR register default to 00 hex.

A bit in the BIP-8 ERROR MASK register is set to cause an interrupt (MINTN) when an incorrect BIP-8 is detected on a particular serial data input port. The bits in the BIP-8 ERROR MASK register default to 00 hex.

The SYNC DECODE NORMAL register and the SYNC DECODE SWITCH register are both reserved for future use.

Referring to FIG. 13, there is shown a register map of the SERIAL CELL ERROR COUNTER registers for each serial data input port 16. A SERIAL CELL ERROR COUNTER register is incremented when a cell is received with a BIP-8 error on an associated one of the corresponding pairs of serial data input ports 16. The SERIAL CELL ERROR COUNTER registers do not roll over, they lock at the top. The SERIAL CELL ERROR COUNTER registers reset on read. FIG. 19 shows how BIP-8 parity is derived.

Referring to FIG. 14, there is shown a register map of the SERIAL MUX SELECT registers for each parallel data output port 18. The bits in the SERIAL MUX SELECT registers (SEL(2:0)) are set to select which particular serial data input port 16 will provide data traffic to a particular parallel data output port 18. The bits in the SERIAL MUX SELECT registers are decoded as follows:

| SEL(2:0) | SERIAL PORT |
|---|---|
| 0 | 1 |
| 1 | 2 |
| 2 | 3 |
| 3 | 4 |
| 4 | 5 |
| 5 | 6 |
| 6 | 7 |
| 7 | 8 |

Referring to FIG. 15, there is shown a register map of a MODE CONTROL register, a SWITCH-OVER CONTROL register, a SWITCH-OVER IDLE LIMIT register, a BACK-PRESSURE CONTROL register, a PLL MINIMUM register, a PLL MAXIMUM register, a RAM BIST CONTROL register, a RAM BIST RESULTS PRAM1–8 register, and a RAM BIST RESULTS SRAM1–4 register.

The START bit (bit 0) in the MODE CONTROL register is used once during initialization to allow the electrical apparatus 10 to begin processing cells. The START bit should be set after the PLL_CLK_REF signal is stable. Once the START bit is set, it should not be changed while the electrical apparatus 10 is in operational mode. Clearing the START bit will stop all cell processing immediately. The only reason to clear the START bit is if the PLL_CLK_REF signal has been lost. The START bit defaults to zero.

The SER_RST bit (bit 1) in the MODE CONTROL register resets a serial clock divider circuit associated with the PLL circuit 32 for test purposes. The SER_RST bit should be cleared for normal operation. The SER_RST bit defaults to one.

The SWITCH bit (bit 2) in the MODE CONTROL register, when set, causes the electrical apparatus 10 to enter a combining mode and a switching mode. The SWITCH bit defaults to zero. This mode is used to support communication links between the CCPs 202A, 202B and the active switch fabric card 206A. Each CCP 202A, 202B is also connected to the presently inactive, or standby, switch fabric card 206B in case of switch fabric switchover.

In combining mode, only serial data input ports IP1-DA, IP1-DB, IP5-DA, and IP5-DB and parallel data output port OPORT-1 are used. In combining mode, data cells received on corresponding pair of serial data input ports IP1-DA and IP1-DB and corresponding pair of serial data input ports IP5-DA and IP5-DB are combined and sent out parallel data output port OPORT-1.

Figure 20:
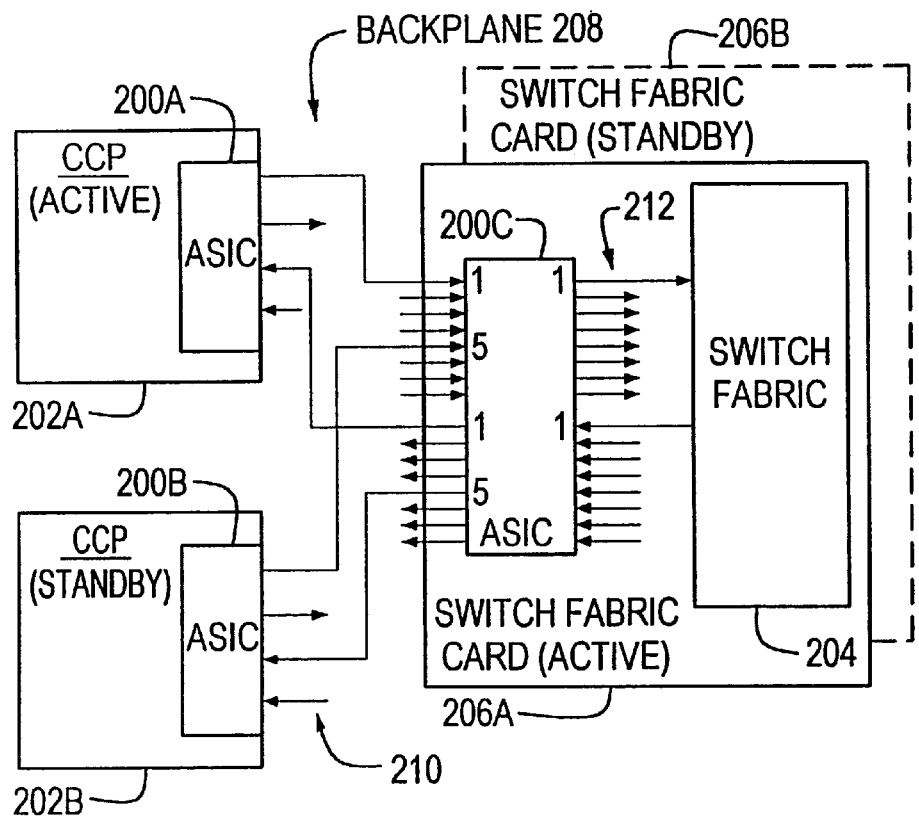
FIG. 20 illustrates network switch elements incorporating the electrical apparatus of FIG. 1 and used in a switching mode.

With regard to FIG. 20, a portion of a switch according to a first embodiment of the present invention is disclosed. Included in this illustration are active and standby central control processors (CCP) 202A, 202B and active and standby switch fabric (SF) cards 206A, 206B. In various embodiments of the present invention, CCPs 202A, 202B serve a control function with regard to other, distributed elements within the switch including selective reset control and interrupt servicing, provide an external interface and control to Ethernet, RS232 or similar communications media, and provide power distribution. The CCPs 202A, 202B can either embody one or more processors, or serve as an interface to a separate card supporting such a processor (s). The function of this processor(s) includes the establishment of the register states such as the SWITCH BIT. Further, the CCPs 202A, 202B can either support a segmentation and reassembly (SAR) unit for a particular transport layer protocol, or can act as an external interface to a separate card supporting such a SAR.

The switch fabric cards 206A, 206B support a respective switch fabric 204. This switch fabric 204 can take many specific embodiments, such as 5:8 demux interfaced to an 8×8 center stage crossbar. A further 8:5 mux resides on the opposite side of the crossbar.

As previously noted, to reduce backplane congestion and the potential for interference, the presently disclosed network switch employs an ASIC 200A, 200B, 200C on each of the cards in FIG. 20 to serialize communications between cards. Thus, data from and to each of the CCPs 202A, 202B is transmitted in serial form via the respective ASICs 200A, 200B to the ASIC 202C on the active SF card 206A. The ASIC 200C on the SF card 206A reconverts the data to parallel form before transferring it to the switch fabric 204.

In order to maximize the utilization of switch resources, it is recognized that the average bandwidth between each of the CCPs 202A, 202B and the active SF card 206A is less than one-half the available bandwidth of one thread through the switch fabric 204; providing a separate thread for each CCP 202A, 202B would waste the remaining bandwidth. Therefore, the presently disclosed ASIC 200 utilizes the above-referenced combining and switching modes to interleave data cells from the two CCPs 202A, 202B onto one thread 212 and vice versa. In FIG. 20, data is received on serial input ports 1 and 5 (IP1-DA, IP1-DB and IP5-DA, IP5-DB above) and the thread 212 is output from the SF ASIC 200C through output port 1 (OPORT-1 above) to a single switch fabric 204 input port. As this ASIC 200C is dedicated to the use of the CCPs 202A, the remaining serial input ports and parallel output ports are unused and the ASIC 200C is always in combining and switching modes via the setting of the SWITCH BIT previously described.

As two cell streams are combined into one in the SF ASIC 200C, idle cells in each of the cell streams from the CCPs 202A, 202B are discarded in the serial receive interfaces of the SF ASIC 200C such that active cells are available for combining; idle cells going to the switch fabric contain no useful information. Normally, idle cells are added on a link so that a cell is sent every 68 clock cycles; the ASIC 200C considers a cell to be an idle cell if it has a QRN field of all ones in byte 3 bits 2 through 7.

As noted, each serial receive port has a two cell FIFO 64 (FIG. 1) for buffering the incoming active cells. The two cell FIFOs 64 allow both CCPs 202A, 202B to send active cells at the same time. The SF ASIC 200C stores the active cells, then unloads the FIFOs 64. The serial receive interface and the parallel port output interface rates are synchronized in a first embodiment of the present invention; once a receive FIFO 64 has approximately eight bytes stored, the ASIC 200C considers a cell to have been received and available for combination.

Once a cell time (i.e. every 68 clocks), the parallel output unloader 74 (also referred to as the RAM Control Circuitry) checks the availability of cells in the receive FIFOs 64. If there is a cell available from both ports, the unloader 74 alternates reading an entire cell from the FIFO of input port 1 and the FIFO of input port 5. If there is only a cell available for one of the two input ports, the unloader services that port. Once the unloader 74 services a port by reading a cell from the port FIFO, the other port FIFO is checked for cell availability. If no cell is available for combining in the other port FIFO, the ASIC 200C will check for availability of a cell from the port FIFO just serviced to avoid wasting the present time slot. If the port FIFO just serviced has another cell to be sent, then that same port will be serviced again. This allows any one port to employ any bandwidth unused by the other port. Thus, one port could theoretically send 100% of the time if the other port is sending only idle cells.

If there is no cell available from either receive port FIFO, an idle cell is generated by the parallel output unloader 74 and is sent out the parallel output port (OPORT-1). In contrast, if an attempt is made to store more than two cells in any one receive port FIFO, the ASIC 200C sets a FIFO overflow status bit for that port. The status bit causes an interrupt if the appropriate interrupt mask bit is set.

In switching mode, one parallel receive port is switched to two serial output ports depending on the state of the switching bit in the cell header. Only parallel data input port IPORT-1 and serial data output ports OP1-DA, OP1-DB, OP5-DA, and OP5-DB are used in switching mode. A data cell received on parallel data input port IPORT-1 is sent out either corresponding pair of serial data output ports OP1-DA and OP1-DB or corresponding pair of serial data output ports OP5-DA and OP5-DB. The switching bit in the cell header (see FIG. 17) determines which corresponding pair of serial data output ports the data cell is sent out on. When the switching bit is one, a data cell received on parallel data input port IPORT-1 is sent out corresponding pair of serial data output ports OP1-DA and OP1-DB and an idle cell is sent out corresponding pair of serial data output ports OP5-DA and OP5-DB. When the switching bit is zero, a data cell received on parallel data input port IPORT-1 is sent out corresponding pair of serial data output ports OP5-DA and OP5-DB and an idle cell is sent out corresponding pair of serial data output ports OP1-DA and OP1-DB. The idle cell sent during switching mode is not the standard ASIC idle cell. Rather, the ASIC 200C duplicates the information in the active cell except that the third byte is overwritten with all ones. The cell duplication enables both CCPs 202A, 202B to receive updated switch fabric status information. The BIP-8 for the cells is then recalculated and inserted into byte 65 of each cell before being transmitted to the CCPs 202A, 202B.

In one embodiment of the present invention, the bandwidth required by each CCP 202A, 202B is less than 50% of the total bandwidth available in the combined single thread within the switch fabric 204. Therefore, no control over the CCP transmission rate is required.

However, in a second, preferred embodiment, cell pacing in the respective CCP 202A, 202B is implemented to prevent the thread bandwidth from being exceeded by the combined CCP traffic. Preferably, pacing ensures that there are no more than two back-to-back active cells on the serial receive interfaces, and that the average bandwidth is kept under 50% to guarantee no cells are lost through combining.

Figure 21:
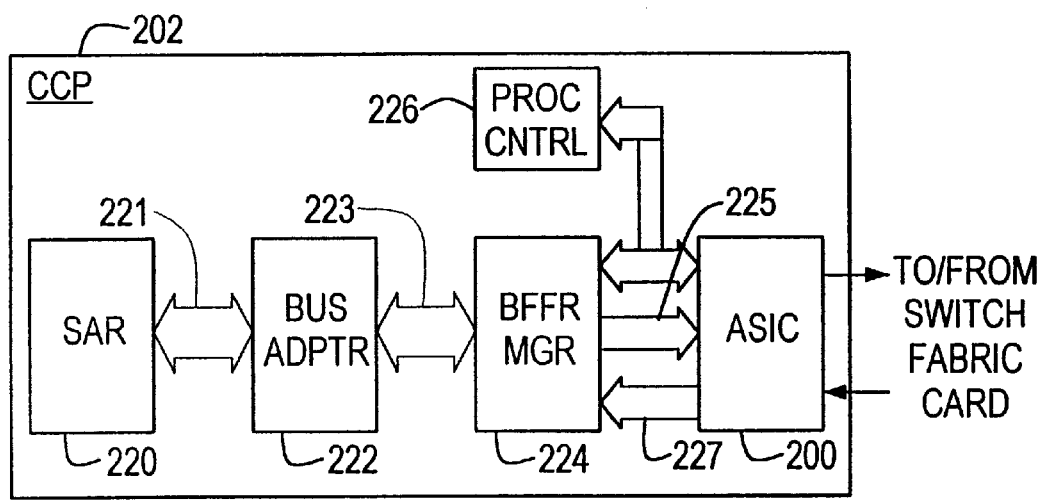
FIG. 21 is a block diagram of elements in a central control processor which result in cell pacing through the electrical apparatus of FIG. 1, enabling cell combining.

A block diagram of elements within a CCP 202 which implements such pacing is found in FIG. 21. Such a circuit is found in both the active and standby CCP 202A, 202B. A segmentation and reassembly (SAR) unit 220 puts CCP control data into a cell format as appropriate for the switch fabric. A buffer manager 224 provides output enqueuing of the reformatted control cells destined for the CCP ASIC 200 via a 100 MHz, 8-bit parallel egress thread 225 and hence to the switch fabric ASIC 200C. Control cells returned from the switch fabric 204 pass through the switch fabric ASIC 200C, across the backplane 208, into the CCP ASIC 200, across a 100 MHz 8-bit parallel ingress thread 227, into the buffer manager 224, and finally to the SAR 220 for parsing into a form interpretable by the CCP processor. In the specific embodiment of an ATM switch, the SAR 220 is an ATMizerII SAR 220. It transmits and receives data across a first bus 221 which in the ATM switch embodiment is provided by two 50 MHz, 8 bit, point-to-point Utopia level 2 buses with associated control logic. A bus adapter 222 in the same embodiment is a CCP Utopia adapter FPGA with a bidirectional, one-ATM-cell deep FIFO to match the 8 bit Utopia level 2 bus to a 16 bit, 50 MHz Utopia level 2 bus which interfaces to the buffer manager 224. A process control block 226 generates a 100 MHz clock for the CCP ASIC 200, the clock being locked to the same timing signal as all other switch elements driving data across the backplane 208. The bus adapter 222 waits for an indication from the CCP ASIC 200 that a first control cell has been forwarded across the backplane 208 and so a second control cell can be forwarded across the 8 bit Utopia level 2 bus 221 from the SAR 220 to the CCP ASIC 200 without it being back-to-back with the first control cell. This avoids exceeding the bandwidth of the combined switch fabric thread in the SF 204.

The PLL_DIS bit (bit 4) in the MODE CONTROL register is used to shut down the PLL circuit 32 for test purposes. The PLL_DIS bit defaults to zero and should not be changed. It should be noted that writing to the PLL_DIS bit will take the electrical apparatus 10 out of operational mode. When out of operational mode, the processor interface 30 will not work. A hard reset on the RESETN signal line 76 is required to recover.

The PD bit (bit 5) in the MODE CONTROL register is reserved for test purposes. The PD bit defaults to zero and should not be changed. It should be noted that writing to the PD bit will take the electrical apparatus 10 out of operational mode. When out of operational mode, the processor interface 30 will not work. A hard reset on the RESETN signal line 76 is required to recover.

The PARITY_EN bit (bit 6) in the MODE CONTROL register, when set, enables parity checking on the parallel data input ports 12. The PARITY_EN bit defaults to zero.

The SW_RST bit (bit 7) in the MODE CONTROL register, when set, places all of the control registers into their default state. The SW_RST bit defaults to zero. Thus, setting the SW_RST bit will automatically reset itself. It should be noted that the SW_RST bit will clear the START bit, which takes the electrical apparatus 10 out of operational mode.

The TSEL(2:0) bits (bits 0–2) in the SWITCH-OVER CONTROL register select which signal will be sent out the TEST pin 78. The TSEL(2:0) bits default to 3 after a hard reset, but to 1 after a software reset. The TSEL(2:0) bits in the SWITCH-OVER CONTROL register are decoded as follows:

| TSEL(2:0) | TEST PIN SIGNAL |
|---|---|
| 0 | recovered clock IP1–4_CLK |
| 1 | recovered clock IP5–8_CLK |
| 2 | output from PLL counter |
| 3 | GROUND |
| 4 | cell received on IPORT-1 |
| 5 | VCC |
| 6 | VCC |
| 7 | VCC |

The enable hardware backpressure (EN_HW_BP) bit (bit 3) in the SWITCH-OVER CONTROL register, when set, allows the electrical apparatus 10 to set bits in the node tag header of data cells (see FIG. 17) sent out of the parallel data output ports 18. This action informs devices which receive the data cells that the electrical apparatus 10 does not want to receive any more active data cells. This action is useful when switching between switch fabrics in a network switch, as it allows a first switch fabric to be drained of active data cells before switching to a second switch fabric. When the EN_HW_BP bit is cleared, the electrical apparatus 10 may not set the above-identified node tag header byte bits. The EN_HW_BP bit defaults to zero.

The enable hardware switch-over (EN_HW_SW) bit (bit 4) in the SWITCH-OVER CONTROL register, when set, allows the electrical apparatus 10 to be under hardware control when switching between switch fabrics in a network switch. When the EN_HW_SW bit is cleared, the electrical apparatus 10 listens to the SW_SF bit (see below) instead. The EN_HW_SW bit defaults to zero.

The enable resync (EN_RESYNC) bit (bit 5) in the SWITCH-OVER CONTROL register, when set, allows the electrical apparatus 10 to toggle the START bit in the MODE CONTROL register during a switch-over. The EN_RESYNC bit defaults to zero and should not be changed for normal operation.

The software switch fabric (SW_SF) bit (bit 6) in the SWITCH-OVER CONTROL register, when set, allows the electrical apparatus 10 to be under software control when switching between switch fabrics in a network switch. That is, if the EN_HW_SW bit is not set, the electrical apparatus 10 looks to the SW_SF bit when switching between switch fabrics in a network switch. The SW_SF bit is useful for stand-alone diagnostic testing of the electrical apparatus 10. The SW_SF bit defaults to zero.

The power down enable (PD_ENB) bit (bit 7) in the SWITCH-OVER CONTROL register, when set, allows the electrical apparatus 10 to power down the serial data input ports associated with the particular group of serial data input signals that are no longer present according to the GONE ERROR bits (1–4 GONE, 5–8 GONE) in the SERIAL PORT STATUS register.

The bits (LIM(7:0)) in the SWITCH-OVER IDLE LIMIT register contains the number of consecutive idle cells that must be received when switching between switch fabrics in a network switch before the electrical apparatus 10 assumes that a first switch fabric has been drained of all active data cells before switching to a second switch fabric. The LIM (7:0) bits default to 10 hex.

The force backpressure (FORCE_BP) bit (bit 0) in the BACK-PRESSURE CONTROL register, when set, will cause the electrical apparatus 10 to overwrite bits 0–7 of bytes 4–8 in the node tag header of data cells transmitted from the parallel data output ports 18 with the value of BP_VALUE bit (see below). When the FORCE_BP bit is set, the electrical apparatus 10 will also set bits 4–7 of byte 9 in the node tag header of data cells transmitted from the parallel data output ports 18. The FORCE-BP bit defaults to zero.

The backpressure value (BP_VALUE) bit (bit 1) in the BACK-PRESSURE CONTROL register contains the value used when forcing backpressure. The BP_VALUE bit defaults to one, and should be programmed to one for normal operation. The BP_VALUE bit can be programmed to zero and used with the FORCE_BP bit during loopback mode for testing.

The bits (MIN(6:0) and MAX(6:0)) in the PLL MIN and PLL MAX registers, respectively, are used to monitor the PLL circuit 32 to verify that it is in lock. If the PLL circuit 32 is locked, the contents of the PLL MIN and PLL MAX registers should have approximately the same value. If the difference between the values of the contents of the PLL MIN and PLL MAX registers grows, the PLL circuit 32 is not locked.

The bits (MODE(1:0)) in the RAM BIST CONTROL register control the RAM built-in self test (BIST) mode. The MODE(1:0) bits in the RAM BIST CONTROL register are decoded as follows:

| MODE(1:0) | MODE |
|---|---|
| 0 | Bypass |
| 1 | Force Failure |
| 2 | Run BIST |
| 3 | not used |

The BIST reset (BRESETN) bit (bit 2) in the RAM BIST CONTROL register is an active low reset to BIST logic associated with both sets of RAM control circuitry 54 and 74. The BRESETN bit defaults to zero and should be low for normal operation. The BRESETN bit must be set to enter any of the BIST modes.

The mode done (DONE*) bit (bit 7) in the RAM BIST CONTROL register is a read-only bit. The DONE* bit indicates that the latest RAM BIST mode that was entered into is done and the results are contained in the RAM BIST RESULTS registers (see below). To clear the DONE* bit, the BRESETN bit must be cleared.

The bits (FAIL(8:1) and FAIL(4:1)) in the RAM BIST RESULTS PRAM1–8 (RAM 46 for parallel data input ports IPORT-1 through IPORT-8) and RAM BIST RESULTS SRAM1–4 (RAM 64 for serial data input ports IP1-DA, IPL-DB through IP4-DA, IP4-DB) registers indicate faults in the PRAMs and the SRAMs, respectively. The FAIL bits are active high, meaning one indicates a fault. To clear the FAIL bits, the BRESETN bit must be cleared.

Figures 16, 17:
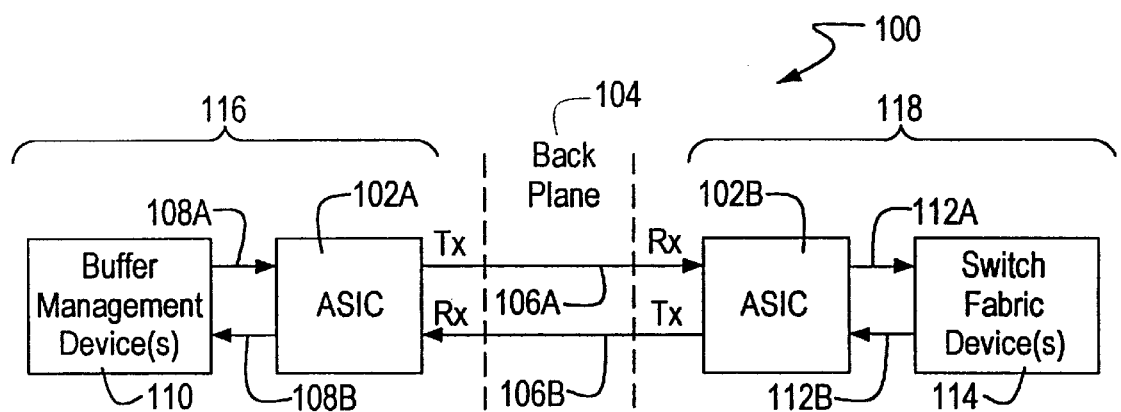
FIG. 16 is a portion of an ATM network switch comprising two application specific integrated circuits (ASICs) incorporating the capabilities of the electrical apparatus shown in FIG. 1.
FIG. 17 shows the format of an ATM data cell that travels across parallel data lines between a buffer management device and an ASIC incorporating the capabilities of the electrical apparatus shown in FIG. 1 and the format of an ATM data cell that travels across parallel data lines between and a switch fabric device and an ASIC incorporating the capabilities of the electrical apparatus shown in FIG. 1.

In one specific embodiment, the electrical apparatus 10 described above may be provided in integrated circuit form for use in an ATM network switch. Referring to FIG. 16, there is shown a portion of an ATM network switch 100 comprising two application specific integrated circuits (ASICs) 102A and 102B incorporating the capabilities of the electrical apparatus 10 described above. The two ASICs 102A and 102B are communicating across a backplane 104 over serial data lines 106A and 106B. The serial data line 106A interfaces with ASIC 102A via serial data output ports OP1-DA, OP1-DB through OP8-DA, OP8-DB, as described above. The serial data line 106A interfaces with ASIC 102B via serial data input ports IPL-DA, IP1-DB through IP8-DA, IP8-DB, as described above. The serial data line 106B interfaces with ASIC 102B via serial data output ports OP1-DA, OP1-DB through OP8-DA, OP8-DB, as described above. The serial data line 106B interfaces with ASIC 102A via serial data input ports IP1-DA, IP1-DB through IP8-DA, IP8-DB, as described above.

The ASIC 102A is also communicating over parallel data lines 108A and 108B with one or more Buffer Management devices 110. The parallel data line 108A interfaces with ASIC 102A via parallel data input ports IPORT-1 through IPORT-8, as described above. The parallel data line 108B interfaces with ASIC 102A via parallel data output ports OPORT-1 through OPORT-8, as described above.

The ASIC 102B is also communicating over parallel data lines 112A and 112B with one or more Switch Fabric devices 114. The parallel data line 112A interfaces with ASIC 102B via parallel data output ports OPORT-1 through OPORT-8, as described above. The parallel data line 112B interfaces with ASIC 102B via parallel data input ports IPORT-1 through IPORT-8, as described above.

It may be assumed that the ASIC 102A and the Buffer Management device(s) 110 are on a first printed circuit board 116 and that the ASIC 102B and the Switch Fabric device(s) 114 are on a second printed circuit board 118. The backplane 104 provides physical connections between the first printed circuit board 116 and the second printed circuit board 118, the first printed circuit board 116 provides physical connections between ASIC 102A and the Buffer Management device(s) 110, and the second printed circuit board 118 provides physical connections between ASIC 102B and the Switch Fabric device(s) 114. More specifically, the backplane 104 provides the serial data lines 106A and 106B between the two ASICs 102A and 102B, the first printed circuit board 116 provides the parallel data lines 108A and 108B between ASIC 102A and the Buffer Management device(s) 110, and the second printed circuit board 118 provides the parallel data lines 112A and 112B between ASIC 102B and the Switch Fabric device(s) 114. Through all of the above-described connections, the two ASICs 102A and 102B allow ATM data cells to be efficiently transferred between the Buffer Management device(s) 110 and the Switch Fabric device(s) 114.

Referring to FIG. 17, there is shown the format of an ATM data cell that travels across the parallel data lines 108A and 108B between ASIC 102A and the Buffer Management device(s) 110, and the format of an ATM data cell that travels across the parallel data lines 112A and 112B between ASIC 102B and the Switch Fabric device(s) 114. Referring to FIG. 18, there is shown the format of an ATM idle cell that may be generated by either ASIC 102A or ASIC 102B for transmission across either parallel data lines 108B or parallel data lines 112A.

The ATM data cells traveling across the parallel data lines 108A and 108B and the parallel data lines 112A and 112B typically use a 100 MHz clock (ICLKP, ICLKN, OCLKP, OCLKN), while the ATM data cells traveling across the serial data lines 106A and 106B typically use a 200 MHz clock (IP1–4_CLK, IP5–8_CLK, OP1–4_CLK, OP5–8_CLK). However, as shown in FIGS. 4 and 5, sampling occurs on both edges of the 200 MHz clock, so the ATM data cells traveling across the serial data lines 106A and 106B are essentially propagating at a 400 MHz clock rate. Thus, there is no reduction in the transmission rate for ATM data cells passing through either ASIC 102A or ASIC 102B.

The present invention is not to be limited in scope by the specific embodiments described herein. Indeed, various modifications of the present invention, in addition to those described herein, will be apparent to those of skill in the art from the foregoing description and accompanying drawings. Thus, such modifications are intended to fall within the scope of the appended claims.

What is claimed is:

1. A network switch, enabling the selective switching and combining of data streams from a plurality of data sources, comprising:

a switch fabric;

combining circuitry for identifying whether data units from a plurality of first data streams have been received on respective inputs of said combining circuitry, for arbitrating among said plurality of first data streams if said plurality of first data streams have been so received, and for sequentially forwarding said data units from a single output of said combining circuitry to said switch fabric via a second data stream; and switching circuitry for receiving, from said switch fabric, sequential data units on a single input of said switching circuitry, via a third data stream, and for forwarding each of said data units to a respective one of a plurality of fourth data streams via a respective output of said switching circuitry, wherein said combining circuitry further comprises a circuit for identifying one of said first data streams from which a data unit was least recently received at said combining circuitry, and for causing a data unit from said identified first data stream to be forwarded to said switch fabric via said second data stream.

2. The network switch of claim 1 further comprising a pacing circuit for limiting the collective bandwidth of all of said first data streams to be combined by said combining circuit to bandwidth equal or less than the bandwidth of said second data stream.

3. The network switch of claim 2, wherein said pacing circuit is further for limiting the bandwidth of each of x first data streams to be combined by said combining circuit to a maximum of 1/x of the bandwidth of said second data stream.

4. The network switch of claim 1, wherein said switching circuitry further comprises a header analysis circuit for analyzing data in a header of each of said third data stream data units indicative of which of said fourth data streams said third data stream data units are to be switched to.

5. A method of combining data units from plural input data streams into a switch fabric in a network switch and of switching data units from said switch fabric to respective ones of plural output data streams, the method comprising the steps of:

identifying, by a combining circuit in said network switch, whether a data unit has been received from at least one of said plural input data streams at a respective one of plural combining circuit inputs;

if a data unit has been received on more than one of said plural combining circuit inputs, arbitrating among said inputs and forwarding one of said received data units to said switch fabric via a single output of said combining circuit;

else, if only one data unit has been received on one of said plural combining circuit inputs, forwarding said received data unit to said switch fabric via said single output of said combining circuit;

receiving a switched data unit from said switch fabric on a single input of a switching circuit in said network switch;

associating said received, switched data unit with a respective output data stream by said switching circuit; and forwarding, by said switching circuit, said received switched data unit to said respective output data stream via one of plural switching circuit outputs.

6. The method of claim 5, wherein said step of arbitrating further comprises identifying one of said plural combining circuit inputs from which a data unit has least recently been forwarded.

7. The method of claim 5, wherein said step of associating further comprises analyzing a switching bit associated with said received, switched data unit.

8. The method of claim 5, wherein said step of identifying further comprises identifying, by said combining circuit in said network switch, whether a data unit has been received from at least one of said plural input data streams, and has been buffered in a respective buffer memory, at a respective one of plural combining circuit inputs.

9. The method of claim 5, wherein said step of forwarding further comprises forwarding, by said switching circuit, an idle data unit to each of said plural output data streams other than said respective output data stream, via said plural switching circuit outputs.

10. The network switch of claim 1, wherein said combining circuitry further comprises buffer memory for buffering said received data units from said plurality of first data streams.

11. The network switch of claim 4, wherein said data in said header comprises a switching word having a value interpretable by said header analysis circuit as being indicative of which of said fourth data streams said third data stream data units are to be switched to.

12. A network switch, enabling the selective switching and combining of data streams from a plurality of data sources, comprising:

a switch fabric;

combining circuitry for receiving data units from a plurality of first data streams on respective inputs of said combining circuitry, and for sequentially forwarding said data units from a single output of said combining circuitry to said switch fabric via a second data stream; and switching circuitry for receiving, from said switch fabric, sequential data units on a single input of said switching circuitry, via a third data stream, and for forwarding each of said data units to a respective one of a plurality of fourth data streams via a respective output of said switching circuitry, wherein said combining circuitry further comprises a circuit for identifying one of said first data streams from which a data unit was least recently received at said combining circuitry, and for causing a data unit from said identified first data stream to be forwarded to said switch fabric via a respective second data stream.

13. The network switch of claim 12 further comprising a pacing circuit for limiting the collective bandwidth of all of said first data streams to be combined by said combining circuit to bandwidth equal or less than the bandwidth of said second data stream.

14. The network switch of claim 13, wherein said pacing circuit is further for limiting the bandwidth of each of x first data streams to be combined by said combining circuit to a maximum of 1/x of the bandwidth of said second data stream.

15. The network switch of claim 12, wherein said switching circuitry further comprises a header analysis circuit for analyzing data in a header of each of said third data stream data units indicative of which of said fourth data streams said third data stream data units are to be switched to.

* * * * *

UNITED STATES PATENT AND TRADEMARK OFFICE
CERTIFICATE OF CORRECTION

PATENT NO. : 6,259,693 B1  Page 1 of 1
DATED : July 10, 2001
INVENTOR(S) : Mahesh N. Ganmukhi et al.

It is certified that error appears in the above-identified patent and that said Letters Patent is hereby corrected as shown below:

Column 17,
Line 15, "IPL-DB" should read -- IP1-DB --; and
Line 31, "IPL-DA," should read -- IP1-DA, --.

Signed and Sealed this

Fourteenth Day of January, 2003

JAMES E. ROGAN
*Director of the United States Patent and Trademark Office*